Aug. 23, 1955     G. W. PFITZNER     2,716,165
MEANS FOR DETECTING CONDUCTIVE IMPURITIES IN OIL
Filed June 19, 1953
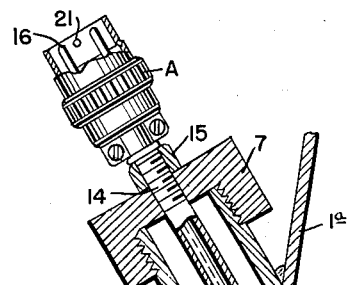
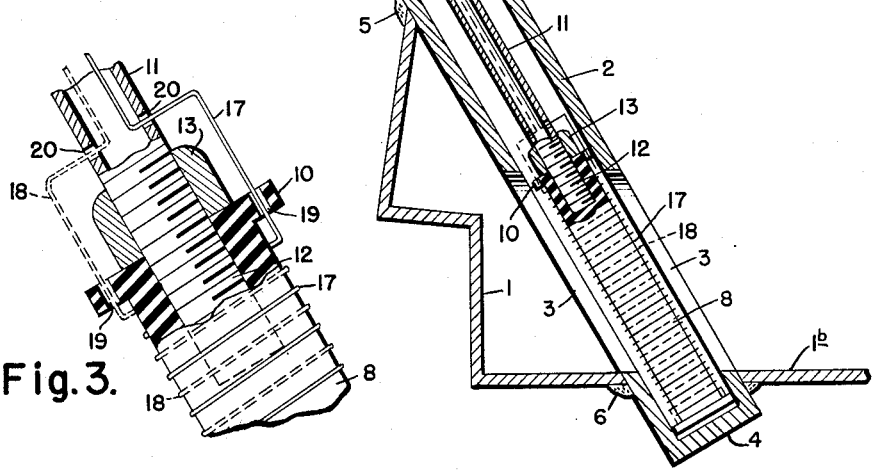
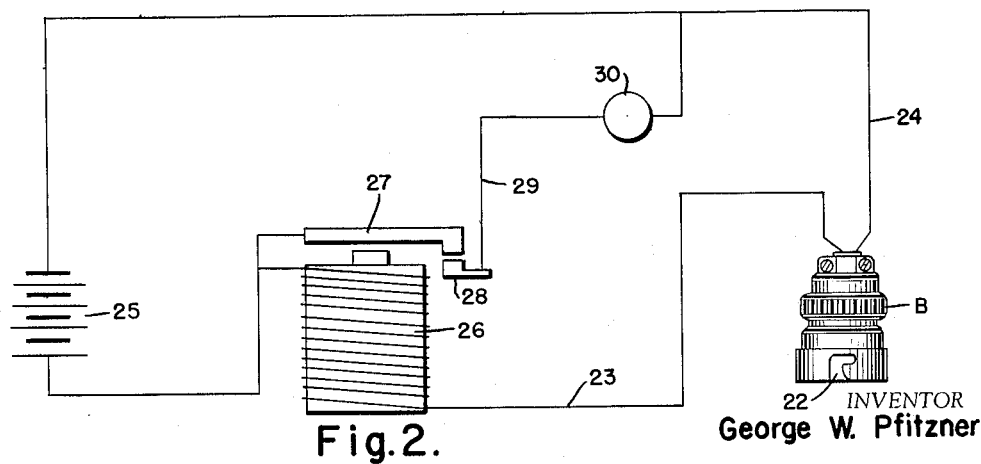
INVENTOR
George W. Pfitzner
BY Martha Conway
ATTORNEY United States Patent Office 2,716,165
Patented Aug. 23, 1955

2,716,165

MEANS FOR DETECTING CONDUCTIVE IMPURITIES IN OIL

George W. Pfitzner, Richmond, Va.

Application June 19, 1953, Serial No. 362,743

3 Claims. (Cl. 200—61.05)

This invention relates to means for detecting the presence of undesired impurities or materials in a body of liquid, and more specifically for detecting the presence of water or other electrically conducting substance in a body of non-conducting liquid such as oil.

While applicable generally to any kind of a tank or container, the invention has special utility when applied to the crank case of internal combustion engines, particularly engines of the diesel type.

An object of the invention is to provide an improved device for detecting and indicating the presence of water mixed with the oil in the crank case of an engine, or other container.

Another object is to devise apparatus which will indicate the presence of metal fragments or other conducting material in the oil, as well as water.

Still another object of the invention is to so design apparatus of this character that it may be rigidly mounted in a container, such as an engine crank case, in such a way that there is no danger of its coming in contact with any moving part.

Yet another object is to devise apparatus of this nature comprising a housing rigidly attached to the crank case or other container, and a separately constructed electrical detecting unit readily insertable in and removable from such housing.

With the above and other objects in view, and to improve generally upon the details of such apparatus, the invention consists in the construction and combination of parts herein described and claimed, and illustrated in the accompanying drawing, forming part of this specification, and in which:

Fig. 1 is a fragmentary vertical section through an engine crank case, illustrating one of my improved detectors mounted therein, parts being shown in elevation;

Fig. 2 is a diagram of the electric signal circuit employed; and

Fig. 3 is a fragmentary vertical section on an enlarged scale, showing some of the parts illustrated in Fig. 1.

Referring to the drawing in detail, 1 designates a container such as a tank or engine crank case, having a side wall 1ª and a bottom 1ᵇ. Extending downwardly into the container is a cylindrical housing 2 having one or more slots or openings 3 in its side adjacent its lower end. These openings preferably terminate at the level of the bottom 1ᵇ, but the housing extends down below this bottom and is closed at its lower end as indicated at 4, thus forming a sump. The housing passes through openings in the side wall and bottom of the container and is secured in position as by welding at 5 and 6.

The upper end of the housing 2 is provided with a screw threaded cap 7 having a threaded opening in its center.

The electrical unit of my improved detecting device comprises a spool 8 of insulating material having a collar 10 at each end. These collars are substantially of the same diameter as the interior of the housing 2 and the spool extends down into the sump formed at the lower end of the housing.

On this spool are wound a pair of bare wires 17 and 18 in the form of spaced helices. These wires may be anchored to the collar at the lower end of the spool and pass through openings 19 at the upper end of the spool. For the sake of clearness, one of these wires has been shown in full lines and the other in dotted or broken lines.

The upper end of the spool 8 is formed with a threaded socket and into this socket is screwed the lower end 12 of a tube 11, the tube being secured in position by means of a lock nut 13. This tube extends upwardly co-axially of the housing and passes through the opening in the cap 7. The tube is threaded at its upper end as indicated at 14 and engages similar threads formed in the cap, and a lock nut 15 secures the parts in position.

Openings 20 are formed in the sides of the tube 11 just above the lock nut 13, and the wires 17 and 18 pass through these openings into the interior of the tube, it being understood that the portions of the wires 17 and 18 above the collar 10 are covered with insulating material, so that they do not come in contact with the tube 11.

Rigidly mounted on the projecting upper end of the tube 11 is one member A of an electric coupling device. This member is shown as a plug element and is provided with a pair of contact pins 16 to which the insulated wires which extend up through the tube 11 are connected.

The electric circuit which is employed in combination with the apparatus above described is shown in Fig. 2. It comprises the other member B of the electric coupling which is in the nature of a socket element. The member A preferably carries a projecting pin 21 which engages in a bayonnet slot 22 in the member B so that the two members may be locked together after being coupled. Any other form of electric coupling may, of course, be employed.

From the coupling member B extend wires 23 and 24 to a battery or other source of current 25, the wire 23 including the winding of a relay 26. This relay is provided with an armature 27 arranged to engage a contact 28, which contact is connected by a wire 29 with the wire 24, leading to the other side of the battery, and includes a signal device 30, which may be a lamp, audible alarm or a suitable relay connected into the control circuit to stop the machine, or any combination of the aforementioned alarms.

From the foregoing it will be understood that oil in the crank case or other container passing through the openings or slots 3 enters and fills the housing 2 up to the level of the oil in the container. So long as nothing but oil enters the housing and surrounds the spool 8, the circuit remains open and no current flows. If, however, any water should become mixed with the oil and, being heavier than oil, should sink to the bottom of the container and enter the sump at the lower end of the housing 2, this water, being a conductor, will serve to bridge the space between the two helices and thus close the circuit, thereby energizing the relay 26 and operating the signal 30.

My improved detector operates particularly well in connection with the crank case of diesel engines, since it is the common practice to add to the water in the water jackets of such engines, a metallic salt, employed as a rust inhibitor, and this renders the water exceptionally conductive.

Not only will my improved device serve to indicate the presence of water in the crank case but it will also indicate the presence of any fragments of metal which may break off from the bearings or gears and work their way down into the sump. These fragments will, of course, bridge the space between the helices and operate the signal 30.

It will be observed that the housing 2 is rigidly secured to the container or crank case in such a manner as to be out of the way of all moving parts, and it will be noted that the electric detector unit comprising the spool, tube and wires may be readily inserted and removed from the housing by taking off the cap 7. This may sometimes be desirable for cleaning or repairing the electric unit.

What I claim is:

1. Means for detecting the presence of electrically conductive impurities in a mass of liquid which is not electrically conductive, comprising a container for the mass of liquid, a tubular housing extending downwardly into the container to a point adjacent the bottom thereof and having an opening near its lower end, a spool of insulating material positioned within the lower end of said housing, a pair of bare wires wound on said spool in the form of spaced helices, a tube disposed axially within said housing and secured at its lower end to said spool, insulated wires extending up from said helices out through said tube, and a circuit connected with said wires.

2. Means for detecting the presence of electrically conductive impurities in a mass of liquid which is not electrically conductive, comprising a container for the mass of liquid, a tubular housing extending downwardly into the container and passing through an opening in the bottom thereof, the lower end of said housing being closed to provide a sump below the level of the container bottom, said housing having an opening substantially at the level of said bottom for establishing communication between the container and the inside of said housing and sump, a pair of coaxial spaced helices of bare wire supported within but insulated from said housing and extending down into said sump, and a circuit connected to said wires in a series circuit.

3. Means for detecting the presence of electrically conductive impurities in a mass of liquid which is not electrically conductive, comprising a container for the mass of liquid, a tubular housing extending downwardly into the container to a point adjacent the bottom thereof and having an opening near its lower end, a spool of insulating material positioned within the lower end of said housing, a pair of bare wires wound on said spool in the form of spaced helices, a tube disposed axially within said housing and secured at its lower end to said spool, a cap at the upper end of said housing having an opening, the upper end of said tube extending up through said opening and being secured to said cap, insulated wires from said helices passing out through said tube, and a circuit connected with said wires.

References Cited in the file of this patent

UNITED STATES PATENTS

| | | |
|---|---|---|
| 1,910,945 | Austin | May 23, 1933 |
| 2,420,177 | Krall | May 6, 1947 |
| 2,510,018 | Gillingham | May 30, 1950 |
| 2,552,088 | Davis | May 8, 1951 |
| 2,556,390 | Harrison | June 12, 1951 |
| 2,563,341 | Kettering | Aug. 7, 1951 |
| 2,592,989 | Wilson | Apr. 15, 1952 |
| 2,684,239 | Gaffney, Jr. | July 20, 1954 |

FOREIGN PATENTS

| | | |
|---|---|---|
| 16,751 | Great Britain | of 1915 |